Jan. 10, 1933.  R. A. WELLMAN  1,893,832
METHOD OF MANUFACTURING BAGS
Filed Oct. 9, 1930   2 Sheets-Sheet 1

INVENTOR
RALPH A. WELLMAN

BY Ely & Barrow

ATTORNEYS

Jan. 10, 1933. R. A. WELLMAN 1,893,832
METHOD OF MANUFACTURING BAGS
Filed Oct. 9, 1930 2 Sheets-Sheet 2
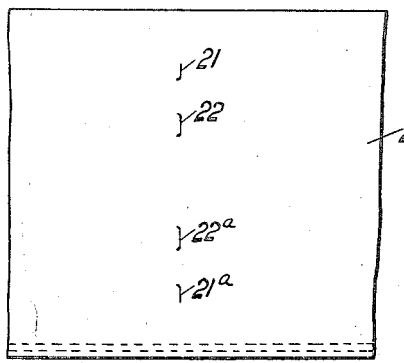
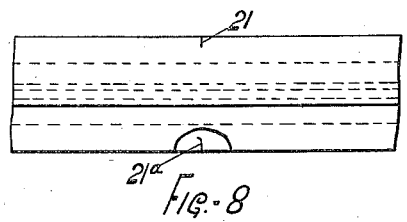
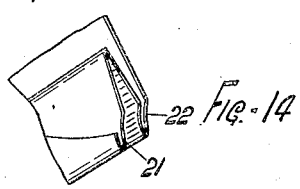
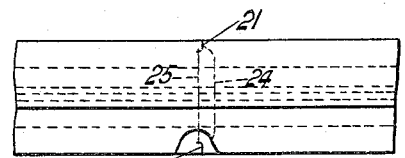
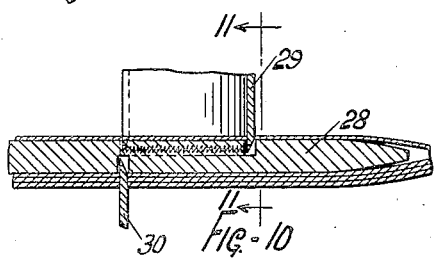
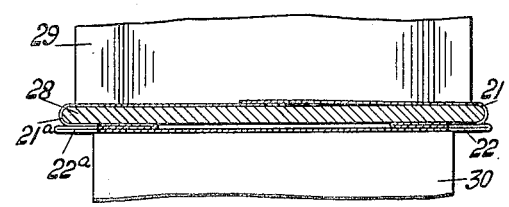
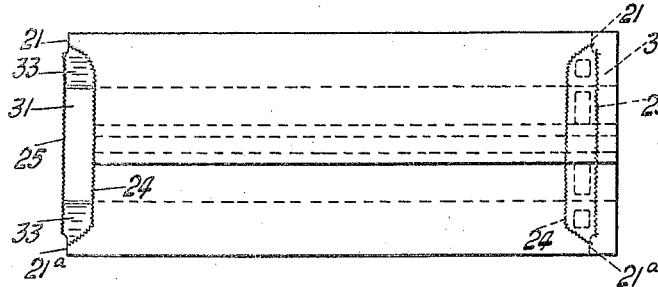
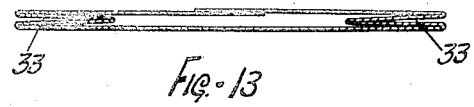
INVENTOR
RALPH A. WELLMAN
BY
Ely & Barrow
ATTORNEYS Patented Jan. 10, 1933

1,893,832

UNITED STATES PATENT OFFICE

RALPH A. WELLMAN, OF CLEVELAND, OHIO

METHOD OF MANUFACTURING BAGS

Application filed October 9, 1930. Serial No. 487,510.

The present invention relates to a new and useful method of manufacturing bags or containers, and has for its object the provision of a series of steps or operations which will improve upon prior methods of making these articles, and will make it possible to make a better bag structure, more expeditiously.

It is a purpose of the invention to devise a new and useful process by which bags may be manufactured from a continuous sheet or web, and provided with a much longer flap than is possible in the present processes of manufacture. The invention has been shown and will be described as applied to the manufacture of flat bags and also to the manufacture of bags having plicated or bellows-like folds, known in the art as square bags. Both types of bags are so constructed that a deep mouth and long flap are provided at one end of the bag, a similar flap at the opposite end of the bag serving as a permanent closure for the bag.

The invention is particularly applicable to the manufacture of these containers from regenerated cellulose sheeting, such for example as known under the trade name "Cellophane", although it is not necessarily limited to that material. With the use of regenerated cellulose sheeting, however, a distinct and novel method of treatment has been found to be necessary, and for this reason certain specific steps are employed which differentiate the process from others or known processes for the manufacture of bags or containers. The process, however, having been made known, may be extended to other materials with equally beneficial results.

It will also be evident that, having explained the invention in the best known form, that changes and modifications may be made therein, all within the scope of the invention.

In the drawings Figures 1 to 6 inclusive, show the process as applied to the manufacture of flat bags in which.

Figures 7 to 14 inclusive show the process as applied to the manufacture of square bags in which:

Figure 7 is a view of the web or sheet of material showing the first step in the process;

Figure 8 shows the web or sheet formed into a tube;

Figure 9 shows the lines of cut which are employed to sever a single bag from the tube;

Figure 10 is a view showing the cutting instrumentalities employed;

Figure 11 is a cross section on the line 11—11 of Figure 10;

Figure 12 is a view of the finished bag;

Figure 13 is a cross section of the finished bag; and

Figure 14 is a detail perspective view.

In the form of the invention relating to the flat bags, the numeral 1 indicates the material which is preferably in the form of a continuous web from which the bags are cut. As the first step in the process, the web is provided, by means of slitter rolls or dies, with transverse slits 2 and 2ª on opposite sides of the central line of the web. These slits are provided with angularly arranged termini, which in the form shown, are curved. The purpose of this angular formation at the ends of the slits is to provide some range in the location of the subsequent transverse cuts, as will be described. If the slits were straight across, accurate register of the transverse cuts would be requisite, but with the slits arranged as shown, or in modified form, the transverse cuts are not required to be accurately registered with the slits. It will be noted that the angular extensions face each other, although they may be reversed if desired. As shown, the slits are equidistant from the central line of the web which brings the seam also in central position. If an off-center position of the seam were desirable, the slits would be shifted accordingly.

Figure 1:
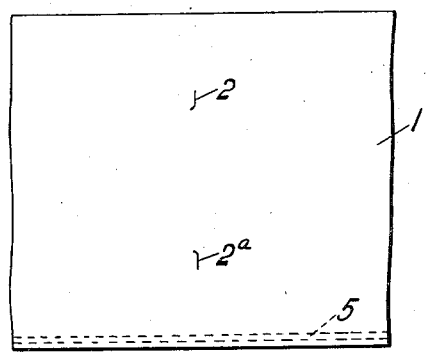
Figure 1 is a view of the web or sheet of material showing the first step in the process.
Figure 2:
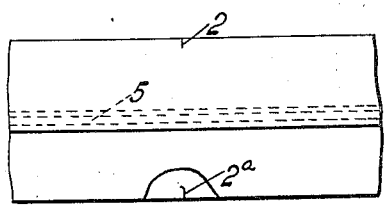
Figure 2 shows the web or sheet folded into tubular form, a portion being broken away.

The edge of the web is provided with a strip of adhesive 5, and the web is then formed into a tube and sealed in the form shown in Figure 2. It will be noted that the lines of longitudinal folds intersect the slits 2 and 2$^a$ so that the slits appear upon both the upper and lower sides of the tube. In the form of the invention shown, the angular extensions of the slits are in the lower panel of the tube. It will be apparent that if the slits were reversed, as suggested above, the angular extensions would appear in the upper side of the tube. The position of the slits is determinative of the location of the severing cuts, as will become apparent.

In order to provide the flap on one side of the finished bag, the next step consists in cutting the bag in opposite directions from the two sides thereof, one of the cuts being a transverse cut, preferably straight, and the other being bowed, or on a curved line.

Figure 3:
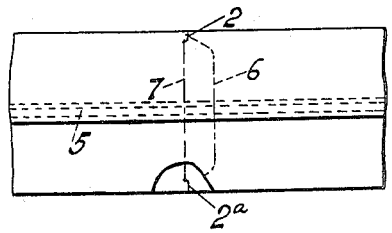
Figure 3 is a view showing the lines of cut which are employed to sever a single bag from the tube.
Figure 4:
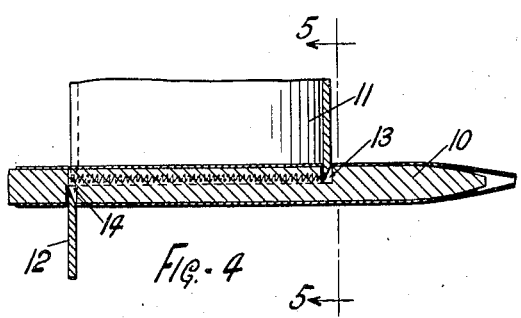
Figure 4 is a view illustrating the cutting instrumentalities employed.
Figure 5:
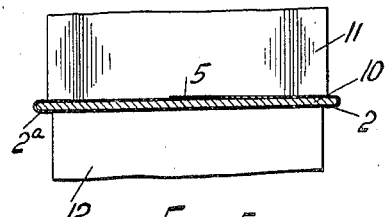
Figure 5 is a reduced cross-sectional view on the line 5—5 of Figure 4.

As shown in Figure 3, the curved or bowed cut is indicated at 6, and is located in the upper or seamed side of the tube. The straight cut 7 is in the lower side. It will be observed that, as shown at the top of Figure 3, the cut 6 intersects the straight portions of the transverse slits, and as the termini of the cut 6 meet the slits 2 and 2$^a$ at an angle, exact registration of the cuts and the slits is unnecessary, and the cuts may extend slightly past the slits for positive cutting. The notch thereby formed in the web is not injurious to the bag as it subsequently appears in the folded permanent closure of the bag. The straight cut 7 intersects the angular extensions as shown at the bottom of Figure 3, and for the same reason and with the same beneficial results, the cut preferably crosses the slits slightly and without injurious effects.

Any suitable cutting mechanism may be employed. In dealing with the particular material which has been described, it is advisable to cut the material rather than to strike it off, and for this reason a cutting mechanism will be shown.

For the purpose of cutting, the tube is conducted over a mandrel 10, and the downward cut in the top panel is made with the appropriate shaped knife 11, while the upward cut in the under panel is made by the straight knife 12. The mandrel is provided with the grooves 13 and 14 to receive the blades.

It will now be apparent that the slits 2 and 2$^a$ lie around the edges of the mandrel so that the knives will completely sever the blanks from the tube. This is necessary, as the mandrel is of appreciable thickness, and the knives cannot cut around the mandrel.

Figure 6:
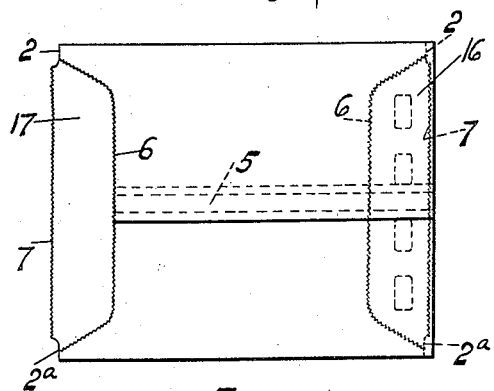
Figure 6 is a plan view of the completed bag.

After the blank is severed, the tab or flap at the leading end of the blank is folded over and sealed as shown in Figure 6, to form the permanent closure flap 16. The flap 17 at the open end of the bag is the lower side of the tube as exposed by the cut 6. This makes the flap 17 out of the front panel of the bag where the panel is without a seam. It is obvious, however, by reversing the cuts with respect to the seam, the flap 17 will appear upon the side having that seam. Such a modification is an obvious variation of the invention.

In the manufacture of the square bag, variations of the process are necessary as will be described. In this form the web is shown at 20, and a plurality of aligned slits 21, 22, 22$^a$, and 21$^a$ in the order named are formed across the web in a transverse direction, the slits 21 and 21$^a$ being outside of the slits 22 and 22$^a$, and pairs of slits 21 and 22 and 21$^a$ and 22$^a$ being on opposite sides of the central line of the web. The slits 21 and 21$^a$ have inwardly directed angular extensions, while the slits 22 and 22$^a$ are provided with angular extensions on both ends of each slit.

The tube is now formed in the usual manner with bellows-like folds, as in the manufacture of all plicated or square bag constructions, it being observed that the longitudinal folds at the edges of the bag panels intersect the slits so that portions of each slit lie on the upper and lower sides of the folded tube. This is shown in Figure 14. As shown, the slits are central with respect to the central axis of the web, which brings the seam in the center of the rear panel. The seam may be shifted in the same manner as described heretofore.

The curved cut 24 is as shown in Figure 9, on the upper side of the tube and intersects the straight portions of the slits 21 and 21$^a$. The straight cut 25 intersects the angular or curved extensions of all of the slits. In either case, the registration feature is preserved as in the first or simpler form of the invention.

For cutting purposes, the tube is led over the mandrel 28, and the cuts are made by the knives 29 and 30 as before, it being noted only that the mandrel 28 enters the tube between the panel bearing the longitudinal seam and the bellows like folds as shown, so that the curved knife 29 cuts only one thickness of the material while the straight knife cuts the other panel and the folds as well.

The resultant bag is shown in Figure 12 in which the permanent closure is made by the flap 30 and the mouth by the flap 31. In this form it will be observed that the bellows folds 33 appear in the mouth of the bag and are coextensive with the panel 31. If the mandrel were located between the unseamed panel and the bellows folds, the knife 29 would cut these panels off, as will be evident. The relative positions of the knives and the leading of the tube over the mandrel determines the location of the seam with respect to the panels, and these elements may be varied as found necessary or advisable. It will also be apparent that the closure flap may be reversed without any substantive change in the invention.

The reentrant slits on the curved angular extensions not only serve the purpose of securing positive registration of the transverse cuts with the slits, making accuracy of the cuts of minor importance, but they also give reentrant bay like recesses across the folds in the bag so the resistance to tearing is increased. This is a valuable asset in the bag as it prevents rupture of the bag mouth upon filling machines.

Various modifications have been suggested as the description has proceeded. It will be evident that other modifications of the invention may be made, all within the scope of the invention. As one modification in the formation of the square bag, the slits 21 and 22 or 21ª and 22ª may be joined across the intervening web material, but this is not believed to be as desirable owing to the fact that the web will be weakened to such an extent as to endanger the tubing operations. The cuts 6 and 7 or 24 and 25 are not necessarily in the form shown, but may be varied as described in the formation of the ends of the bag. It will be further noted that the knives are in substantial register only at the ends thereof where they both intersect the slits.

What is claimed is:

1. A process of manufacturing bags, comprising providing a web of bag material with a plurality of slits arranged transversely of the web and extending in a transverse direction with respect thereto, forming a tube from the web by folding the same along lines intersecting the slits, and cutting blanks from the tube by cuts from opposite sides thereof, said cuts joining the slits, one of said cuts being concave with respect to the other to provide a flap in the opposite side of the tube.

2. A process of manufacturing bags, comprising providing a web of bag material with a plurality of slits arranged transversely of the web, the slits extending in a transverse direction and having angular extensions, forming a tube from the web by folding the same along lines intersecting the slits and cutting bag blanks from the tube by cuts from opposite sides thereof, one of said cuts intersecting the extensions of the slits, and the other cut being concave and having its ends intersecting the straight portions of the slits.

3. A process of manufacturing bags comprising providing a web of bag material with a plurality of slits arranged transversely of the web, the slits extending in a transverse direction and having angular extensions, forming a tube from the web by folding the same along lines intersecting the slits, and cutting bag blanks from the tube by cuts from opposite sides thereof, one of said cuts being straight across the tube and intersecting the extensions of the slits, and the other cut being concave and having its ends intersecting the straight portions of the slits.

4. In the process of making a bag from a web, the steps of providing the web with transversely arranged slits, each slit having an angular extension, folding the web longitudinally into a tube with the slits located in the folds and with the extensions on the same side of the tube, severing the tube into blanks by straight and concave cuts from opposite sides of the tube, the concave cut intersecting the straight portions of the slits, and the straight cuts intersecting the angular extensions of the slits.

5. The process of forming a bag blank from a web, comprising providing the web with transverse slits having angular extensions, forming a tube from the web, and cutting the tube by repeated straight and bowed cuts, the ends of which are in substantial register and intercept the slits.

6. The process of forming a bag blank from a web, comprising providing the web with transverse slits across the web, forming a tube from the web with portions of the slits in opposite sides thereof and severing the tube by cuts from opposite sides thereof, one of said cuts being concave with respect to the other, the said cuts intercepting the slits.

7. The process of forming a bag blank from a web, comprising providing the web with transverse slits, forming a tube from the web by longitudinal folds which intersect the slits, and cutting the tube by repeated cuts in opposite directions, the cuts being out of register except at the ends thereof where they jointly intersect the slits.

8. The process of forming a bag blank from a web comprising providing the web with transverse slits, forming a tube from the web by folding the same longitudinally along lines which intersect the slits, and cutting the tube into blanks by cuts entering the tube from opposite sides thereof, at least one of the cuts being provided with end portions which intersect the slits and extend in the general direction of the web.

RALPH A. WELLMAN.